Sept. 21, 1965  D. B. BURKHARDT  3,207,579
PROCESS FOR PRODUCING HYDROGEN FLUORIDE
Filed Oct. 23, 1961
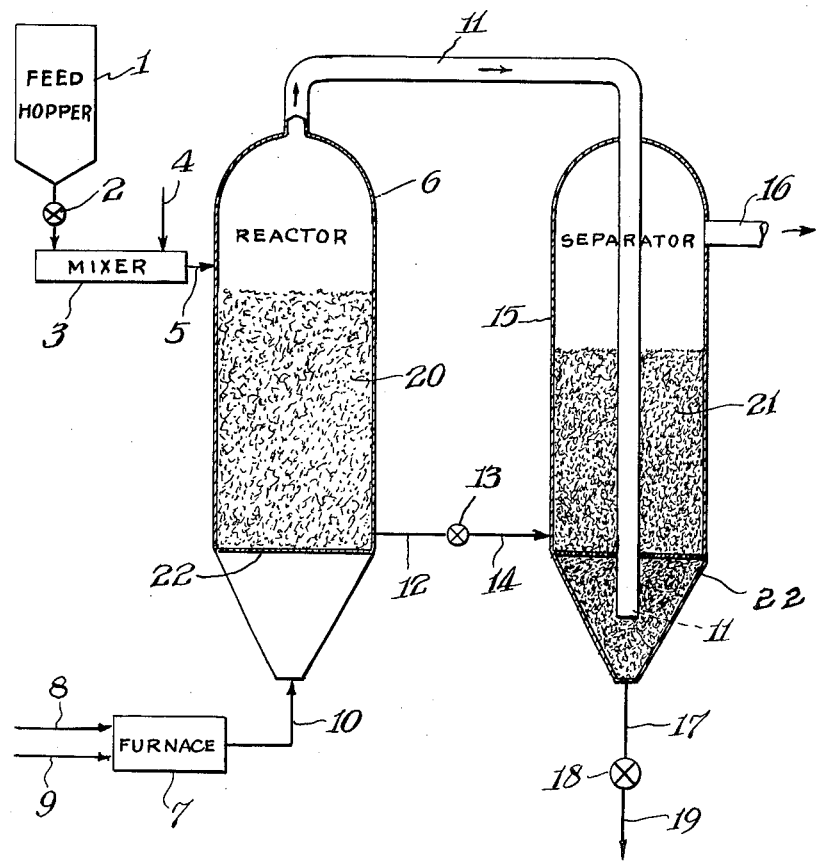
INVENTOR
Donald B. Burkhardt
BY
C. N. Mortenson
ATTORNEY 3,207,579
PROCESS FOR PRODUCING HYDROGEN
FLUORIDE
Donald B. Burkhardt, 20 Monterry Drive, Brookside,
Newark, Del.
Filed Oct. 23, 1961, Ser. No. 146,702
10 Claims. (Cl. 23—153)

This invention relates to the manufacture of hydrofluoric acid. More particularly, it relates to an improved continuous process for the preparation of hydrogen fluoride.

In general, commercial processes for manufacturing hydrogen fluoride utilize the continuous reaction of fluorspar with sulfuric acid in rotary kilns or retorts (tubes) which are indirectly heated. The crude hydrogen fluoride passes as a gas from the generator to purifiers where impurities such as other gases, acid mists, fogs and entrained liquids and solids, are removed. The final product is hydrogen fluoride in fluid form, either as a gas or a liquid. The process is usually carried out at atmospheric or subatmoshperic pressure at temperatures and reaction rates requiring about 1–5 hours' retention time for the reactions. Further, recovery of the generated hydrogen fluoride as a liquid requires the use of substantial quantities of refrigerating agents.

It is appreciated that the production of hydrogen fluoride is taught under pressure above atmospheric, with the use of dehydrating materials such as sulfates of the alkaline earth metals, with the use of a mist removal agent, such as coke, for removing dust and sulfuric acid mist and with the application of external heat at temperatures of about 100° to about 320° C. But the problems of getting proper heat transfer still exist in spite of attempts to use slurries, and direct heating has not hithertofore been accomplished successfully.

Thus, an objective of this invention is the provision of a method for producing hydrogen fluoride in a reactor by direct heating. A further purpose is to effect faster reaction rates and shorter retention time in the reactors of the products. Another aim is to provide a method of treating the crude hydrogen fluoride to remove gaseous, liquid and solid impurities. A still further object is to provide a process which will permit the generation of hydrogen fluoride gas under sufficient pressure to minimize or eliminate refrigeration for liquefaction by extraneous means and agents. Another aim is to reduce the size of the equipment needed. These and other objectives will appear hereinafter.

The objects of this invention are accomplished by fluidizing a solid, such as calcium sulfate, generally from the process as a by-product, and heating the fluidized bed with the gas that is used in effecting the fluidization. To this heated fluidized bed, is added a mixture of a fluorine compound such as an alkali-metal or alkaline earth fluoride, such as, sodium fluoride or fluorspar, and sulfuric acid which mixture becomes heated by contact with the heated calcium sulfate particles. The reaction mixture is added at the top of the fluidized bed and this fluidized bed is used as a generator. The desired reaction occurs with the production of hydrogen fluoride and a sulfate, such as calcium sulfate when fluorspar is used. The process may be conducted under pressure with the result that ambient cooling water or air can be used in the condensation step rather than costly refrigerants. With the reaction occurring rapidly at the top of fluidized bed, the bottom contains very little, if any, unchanged fluoride; it is generally only calcium sulfate. Products and by-products and unchanged materials are effectively separated by passing the gaseous product to a second fluidized bed used as a separator. The production of hydrogen fluoride is effected in high yields in short periods of time.

This invention may be further understood with reference to the following exemplary material and the drawing given for illustrative puropses only and not to be taken as limitative.

The drawing diagrammatically shows one form of apparatus which may be used in this invention.

Referring to the drawing, fluorspar from the feed hopper, 1, passes through the fluorspar feeder, 2, into the mixer, 3. Sulfuric acid, from a separate storage and feeder system (not shown), at any desirable strength enters the mixer, 3, via pipe, 4, at any desired location,, and is mixed thoroughly with the fluorspar. The resultant mixture leaves the mixer via pipe, 5, and passes into the reactor vessel, 6. The reactor contains a fluidized bed, 20, of reaction by-product calcium sulfate. The bed is kept fluidized and heated by the passage of combustion gases from the furnace, 7, via pipe 10, through baffle plate or porous membrane, 22.

The reaction between the fluorspar and the sulfuric acid is carried to completion by heating the mixture to a selected temperature by contact with the heated particles of calcium sulfate in the fluidized bed, 20. The resulting calcium sulfate may accumulate in the bed necessitating subsequent withdrawal of the calcium sulfate from the reactor to maintain a desired fillage in the reactor; withdrawal may be made via pipe 12, and regulated by the control valve, 13. In the drawing, the calcium sulfate by-product leaves the control valve, 13, and passes into the separator vessel, 15, via pipe 14. The crude hydrogen fluoride gas leaves the reactor, 6, via pipe 11; in the drawing, this gas stream passes into the separator, 15.

The separator vessel contains a fluidized or semi-fluidized particle bed, 21, of a selected solid substance. In the drawing, the crude hydrogen fluoride gas enters the separator via pipe 11, which discharges the gas inside the fluidized bed, 21, near hte bottom; the crude hydrogen fluoride gas fluidizes the bed as it passes upwardly through the solid particles. By using suitable solid substances in the separator bed, it is possible to remove selectively gaseous impurities, mists, fogs and entrained liquids and solid impurities from the crude hydrogen fluoride gas. The preferred solid substance for the bed, 21, is the by-product calcium sulfate formed by the reaction in the reactor, 6. As described previously, the by-product material may enter the separator via pipe 14. A desired level of material, 21, in the separator may be maintained by the control of material from the separator via pipe 17, to the control valve, 18. The solid particles leave the control valve, 18, via pipe 19, and may be disposed of or recovered as desired. The gas leaves the separator via pipe 16, and may be utilized directly or passed through additional separation, purification and recovery facilities.

In the furnace, 7, certain selected substances may be employed as the fuel, or as the oxidant; the heat of reaction of these substances will provide the heat needed for the endothermic reaction of the fluorspar and sulfuric acid. The fuels may comprise the following combustible gaseous, liquid, or solid substances, either singly or in combination, such as hydrogen, hydrogen sulfide, hydrocarbons, sulfur, phosphorus, the alkali or alkaline earth metals, carbon, aluminum, iron, silicon, lead, zinc, boron, copper, magnesium, nickel, and tin. The preferred fuels, due to their low cost, are hydrogen gas or carbon in the form of coke. The oxidants may consist of selected gaseous, liquid, or solid materials, either singly or in combination, such as gas containing oxygen, chlorine, fluorine, hydrogen fluoride or carbon oxides, liquid peroxides, or solid oxides, peroxides, permanganates, and perchlorates. While simple streams such as heated air, carbon dioxide, carbon monoxide or nitrogen may be used to supply the heat of reaction, they dilute the fluoride gas stream to such an extent that recovery of hydrogen fluoride is impractical; hence it is preferred to use combustion reactions as the heat source, the preferred oxidant being oxygen gas. While calcium sulfate is preferred as the solid powdered material for the fluidized beds, other materials may be used. These include crushed coke, crushed stone, pulverized metals, pulverized synthetics such as the plastics and the silver vanadates, such as the ortho, meta or pyrovanadate or mixtures thereof. The materials may be porous or non-porous, wet or dy, inert or reactable with the components in the system, as, for example, those in the crude hydrogen fluoride stream.

In practice, in either continuous or batchwise processes, the reactor fluidized bed, 20, is heated with sufficient combustion gases from the furnace, 7, to maintain the solid particles at a temperature between 100–400° C.; preference is for bed temperature between 200–300° C. In the preferred temperature range, transfer of heat from the fluidized bed particles to the pieces of the fluorspar-sulfuric acid mixture dropping onto the fluidized bed is sufficiently rapid so that reaction rates are achieved which permit nearly complete reaction of the mixture in 1–20 minutes. The movement of the fluid bed is helpful in removing, by abrasion, the continuously formed calcium sulfate by-product from the surface of the reacting pieces; hence, heat transfer is facilitated. To prevent heat loss and possible corrosion in the reactor, its shell may be insulated either internally or externally. Dust collectors suitable for hydrogen fluoride atmospheres may be utilized inside the reactor and/or the separator to prevent excessive carry over of solids in the crude hydrogen fluoride gas stream. Operating pressure in the reactor may range from sub-atmospheric to 300 p.s.i.a., the preferred range is atomspheric to 50 p.s.i.a.

In the separator, the operating temperature of the fluidized bed, 21, may range between 20–400° C. The preferred range is 20–150° C., since it has been found that the removal of condensible gases, acid mists, fogs, and some entrained liquids is more readily accomplished at these lower temperatures. In particular, it was found that the fluidized solid particles of reaction by-product calcium sulfate had the ability to absorb water vapor and acid mists present in the inlet crude hydrogen fluoride gas. By permitting the liquid content of the fluidized bed particles to increase to 5–30% by weight, it was found that some entrained solids were removed from the inlet crude gas. The separator, 15, may be operated in the same pressure range as utilized in the reactor. Hence, the use of the fluidized bed separator provides a means of purifying the generated crude hydrogen fluoride gas from the reaction step.

From the above it is noted that bed 20 is fluidized by the passage of hot combustion gases and the hydrogen fluoride gas generated in the bed. The combustion gases enter the bottom of the bed through a gas-distributor baffle and suspend or fluidize the bed particles, the gas velocities being 1–50 feet/second, but preferably 2–10 feet/second. The particle size in the bed ranges from sub-micron to ½ inch diameter but preferably is 10–1000 microns. The bed heights may range from 2 inches to 20 feet but preferably are 3–6 feet. Control is effected by withdrawal of the solid bed particles. The bed temperature is maintained as desired, usually 250–300° C. by controlling the feed material rate, the amount and temperature of combustion gases passed through the bed, and the amount of cooling by heat loss through the reactor shell. The semi-solid acid-fluoride feed mixture is dropped onto the top of the fluidized bed where it is heated by contact with the hot bed particles, and begins to react to produce the desired hydrogen fluoride gas; the feed mixture is thereby rapidly heated, and the reaction rate is very high. As the mixture reacts, a friable sulfate by-product is formed on the particle surfaces; this by-product is quickly removed by abrasion in the fluidized bed. Hence, the original mixture particle size is rapidly reduced while reaction is proceeding at a high rate since heat transfer to supply the heat for reaction is rapid in the fluidized bed. Basically, the operation is carried out so as to add a relatively small amount of feed material to a greater amount of the fluidized bed material.

The bed 21 is fluidized by the passage of the combustion gases and the generated hydrogen fluoride from the reactor, 6, into the bottom of bed 21 through a gas-distributor baffle and upwardly through the bed particles at a superficial gas velocity of 1–50 feet/second, preferably 1–3 feet/second. The particle size in the bed ranges from sub-micron to ⅛ inch diameter but preferably is 10–1000 microns. The bed heights may range from 2 inches to 20 feet, but preferably are 3–10 feet, again being effected by withdrawal of solids from the bed. The particles in the bed may be added batchwise or continuously to the bed at the top, bottom, or side of the separator, 15; preference is for particles comprising reactor by-product solids to be added continuously to the bottom side of the separator vessel as shown in the illustration. Other gaseous, liquid, or solid materials may be added to the separator through other openings not shown, either batchwise or continuously. The shell of the separator may or may not be insulated to prevent heat loss, and may be separately heated or cooled to control fluidized bed temperatures in the range 20–150° C., usually 100° C.

Extraneous cooling agents such as liquid hydrogen fluoride may be added to the bed through separator shell openings, not shown, and these may also act as axiliary fluidizing gases. In practice, cooling is preferably achieved by externally cooling the separator shell with water. At temperatures near 100° C., sulfuric acid and other mists and fogs will condense on or be absorbed on the fluidized bed particles. In some cases, it may be desirable to increase the liquid content of the bed to 5–30% by wt. by adding liquid wetting agents such as sulfuric acid to the bed particles through separator shell openings, not shown.

*Example I*

A 2 inch diameter by 3 feet long stainless steel tube, wrapped with insulation to prevent heat loss, was used as the reactor. About 1000 gms. of powdered calcium sulfate of size 10–1000 microns was placed on a perforated baffle plate having 20 openings of ⅛ inch diameter which plate was located near the bottom of the tube. Hot carbon dioxide gas at 1.5 atm. pressure and 600° C. from the combustion of coke with air was passed upwards through the calcium sulfate particles at a velocity of 2 feet/second to fluidize the particles and to heat them to 300° C. When a thermocouple in the calcium sulfate bed indicated that 300° C. was reached and was being maintained, about 100 gms. of a separately prepared, powdered (10–1000 microns size) solid mixture of the alkaline-earth-metal fluoride, also mineral fluoride, fluorspar (98% calcium fluoride) and sulfuric acid (100% sulfuric acid) at a calcium fluoride/sulfuric acid mol ratio of 1.0 were added uniformly to the top of the fluidized particles in the reactor over a 1 minute interval. Gas from the reactor was passed through a refrigerated 1 inch diameter stainless steel tube to cool the gas to −70° C. and to condense the hydrogen fluoride present; about 99% of the hydrogen fluoride present in the gas stream was collected in the cooled tube. The amount of hydrogen fluoride in the reactor off-gas was then determined by measuring the amount of hydrogen fluoride condensed in the refrigerated tube. A material balance indicated that 95% conversion of the calcium fluoride in the fed mixture to hydrogen fluoride in a 5 minute reaction time at 300° C. reactor bed temperature was attained.

*Example II*

Analysis of the collected hydrogen fluoride condensate in Example I indicated the presence of sulfuric acid as an undesirable impurity. Another test under the same conditions as in Example I was conducted except that gas leaving the reactor was passed through another 2 inch diameter by 3 feet long uninsulated stainless steel tube (separator) containing 1000 gms. of the reactor bed material from Example 1 reactor in a fluidized state at 100° C. Gas from this tube was cooled and condensed as in Example I. Analysis of the hydrogen fluoride condensate showed no trace of sulfuric acid, indicating that the fluidized bed material in the separator tube had effectively removed the sulfuric acid from the crude hydrogen fluoride gas stream leaving the reactor tube. Hence, material from the reactor bed appeared capable of effectively separating sulfuric acid from the gas stream.

*Example III*

Analysis of the collected hydrogen fluoride condensate in Example II indicated the presence of traces of sulfur dioxide which is an undesirable impurity in the crude hydrogen fluoride gas stream. A test was made under similar conditions as in Example II except that 100 gms. of powdered silver vanadate (10–1000 microns size) was added to the separator bed prior to fluidization in the usual manner. Gas from the separator tube was condensed and collected as in Example II; the hydrogen fluoride condensate was found free of sulfur dioxide. The powdered silver vanadate mixture had apparently adsorbed, or reacted with the sulfur dioxide present in the gas stream, and hence effectively separated sulfur dioxide from the crude hydrogen fluoride gas stream.

*Example IV*

To test the suitability of alkali-metal fluorides as a raw material to produce hydrogen fluoride by reaction with sulfuric acid, a test under similar conditions to those in Example I was made except that the reactor fluidized bed was composed of sodium sulfate instead of calcium sulfate. The solid feed-material particles in this case consisted of sodium fluoride (99%) and sulfuric acid (100%) at a mol ratio of 2 to 1, respectively. The mixture was fed to the heated (300° C.) fluidized reactor bed particles, reacted for a 5 minute interval, and the generated gas condensed and collected as in Example I. A material balance indicated that 95% conversion of the sodium fluoride in the feed mixture to hydrogen fluoride was attained in the 5 minute reaction time at 300° C. reactor bed temperature. These results revealed that alkali-metal fluorides will react in the same manner as alkaline-earth-metal fluoride (calcium fluoride) to produce hydrogen fluoride by reaction with sulfuric acid.

This invention affords a very economical production of hydrogen fluoride. Not only are yields increased and reaction times diminished, but equipment size and costs are reduced. Further, the reactions and the conditions thereof, such as temperature and pressure, are readily controlled. The process is continuous; effluent produced as a product is effectively used as a fluidizing agent. Finally, the desired product is isolated in a substantially pure state, separated from water, sulfur compounds and other impurities.

While the invention has been disclosed here in connection with certain embodiments and certain procedural details, it is clear that changes, modifications, or equivalents can be used by those skilled in the art; accordingly, such changes within the principles of this invention are intended to be included within the scope of the claims below.

I claim:
1. A process for the production of hydrogen fluoride which comprises passing a mixture of a metal fluoride and sulfuric acid to a pulverized solid bed comprising calcium sulfate contained in a vessel and maintained in a fluidized state and heated to a temperature of about 100° C. to about 400° C.; passing an ascending current of a heated gas through the resultant mixture of said fluoride, acid and calcium sulfate to fluidize the bed and to heat the ingredients of said mixture in order to effect a reaction between the metal fluoride and the sulfuric acid; passing the hydrogen fluoride generated by said reaction as a gaseous, fluidizing effluent to a second fluidized solid bed contained in a second separate vessel, the solid material in said second bed comprising pulverized calcium sulfate maintained at about 20° C. to about 150° C. to retain impurities in the generated hydrogen fluoride, said impurities being in the form of gases, mists, fogs, entrained liquids, and solid particles; and effecting the purification of said hydrogen fluoride by said retention of said impurities by the said fluidized bed of calcium sulfate and by the separation of the resultant purified hydrogen fluoride from the said second bed and the retained impurities by passage of said purified gas from said second vessel to subsequent collection and recovery.

2. A process in accordance with claim 1 in which the temperature of the pulverized solid in the fluidized bed in the first vessel is maintained in the range of about 200° C. to about 300° C.

3. A process in accordance with claim 1 in which the pressure in the first vessel is maintained in the range of subatmospheric to about 300 p.s.i.a.

4. A process in accordance with claim 3 wherein said pressure is about 20 p.s.i.a. to about 50 p.s.i.a.

5. A process in accordance with claim 1 in which the temperature of the pulverized solid in the fluidized bed of the second vessel is maintained in the range of about 20° C. to about 150° C.

6. A process in accordance with claim 5 in which the said temperature is about 30° C. to about 40° C.

7. A process in accordance with claim 1 in which the pressure in the second vessel is maintained in the range of subatmospheric to about 300 p.s.i.a.

8. A process in accordance with claim 7 in which the pressure in the second vessel is maintained in the range of about 20 p.s.i.a. to about 50 p.s.i.a.

9. A process in accordance with claim 1 which includes the step of oxidizing a fuel in a combustion chamber to provide said heated fluidizing gas to the first vessel.

10. A process in accordance with claim 1 in which the said second fluidized bed contains a powdered silver vanadate as a purifying agent.

References Cited by the Examiner

UNITED STATES PATENTS

| | | | |
|---|---|---|---|
| 2,088,048 | 7/37 | Bishop | 23—153 X |
| 2,686,151 | 8/54 | Feldbauer et al. | 23—153 X |
| 2,882,243 | 4/59 | Milton | 23—112 X |
| 3,004,829 | 9/61 | Boyle et al. | 23—153 |

FOREIGN PATENTS 939,867 3/56 Germany.

OTHER REFERENCES

Chem. Abstracts, vol. 52, page 14108. Copy in U.S. Patent Office. Scientific Library.

MAURICE A. BRINDISI, *Primary Examiner.*